(12) United States Patent
Johnson et al.

(10) Patent No.: US 6,751,683 B1
(45) Date of Patent: Jun. 15, 2004

(54) METHOD, SYSTEM AND PROGRAM PRODUCTS FOR PROJECTING THE IMPACT OF CONFIGURATION CHANGES ON CONTROLLERS

(75) Inventors: Francis E. Johnson, Poughkeepsie, NY (US); Gary M. King, Millbrook, NY (US); William J. Rooney, Hopewell Junction, NY (US); Peter B. Yocom, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 09/676,715

(22) Filed: Sep. 29, 2000

(51) Int. Cl.[7] .............................. G06F 13/00; G06F 9/45
(52) U.S. Cl. .............................. 710/16; 702/1; 702/2; 702/100; 702/104; 709/105; 709/104; 709/226; 710/8; 710/10; 710/15; 710/38; 713/100; 714/4; 714/30
(58) Field of Search ................... 702/1, 2, 100, 702/104; 709/104, 105, 226; 710/38, 8, 10, 15, 16; 713/100; 714/4, 30

(56) References Cited

U.S. PATENT DOCUMENTS

| 3,702,006 | A |   | 10/1972 | Page ........................ 709/105 |
| 4,403,286 | A |   | 9/1983 | Fry et al. ................... 709/105 |
| 5,170,472 | A |   | 12/1992 | Cwiakala et al. .............. 710/8 |
| 5,301,323 | A |   | 4/1994 | Maeurer et al. ............ 709/105 |
| 5,546,549 | A |   | 8/1996 | Barrett et al. ............... 710/305 |
| 5,699,532 | A |   | 12/1997 | Barrett et al. ............... 710/305 |
| 5,881,238 | A |   | 3/1999 | Aman et al. ................ 709/226 |
| 6,067,580 | A |   | 5/2000 | Aman et al. ................ 709/330 |
| 6,223,171 | B1 | * | 4/2001 | Chaudhuri et al. ............ 707/2 |
| 6,223,343 | B1 | * | 4/2001 | Hopwood et al. .......... 717/101 |
| 6,434,637 | B1 | * | 8/2002 | D'Errico ...................... 710/38 |
| 6,467,088 | B1 | * | 10/2002 | alSafadi et al. ............. 717/173 |
| 6,550,017 | B1 | * | 4/2003 | Moiin et al. ................... 714/4 |

* cited by examiner

Primary Examiner—Jeffrey Gaffin
Assistant Examiner—Tammara Peyton
(74) Attorney, Agent, or Firm—Andrew J. Wojnicki, Esq.; Blanche E. Schiller, Esq.; Heslin Rothenberg Farley & Mesiti P.C.

(57) ABSTRACT

An impact of configuration changes on controllers is projected. This projection quantifies the impact for each controller affected by the change, such that it is known by a quantifiable value how much the change impacts the controller. In order to project the impact, a projected I/O velocity of the controller is determined.

31 Claims, 13 Drawing Sheets

METHOD, SYSTEM AND PROGRAM PRODUCTS FOR PROJECTING THE IMPACT OF CONFIGURATION CHANGES ON CONTROLLERS

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Method, System And Program Products For Determining Whether I/O Constraints Exist For Controllers Of A Computing Environment," Rooney et al., Ser. No. 09/676,714, filed herewith;

"Dynamically Redistributing Shareable Resources Of A Computing Environment To Manage The Workload Of That Environment," Kubala et al., Ser. No. 09/408,470, filed Sep. 28, 1999;

"Method, System And Program Products For Managing Groups Of Partitions Of A Computing Environment," Kubala et al., Ser. No. 09/407,391, filed Sep. 28, 1999;

"Method, System And Program Products For Managing Central Processing Unit Resources Of A Computing Environment," Eilert et al., Ser. No. 09/407,212, filed Sep. 28, 1999;

"Method, System And Program Products For Managing Logical Processors Of A Computing Environment," King et al., Ser. No. 09/407,594, filed Sep. 28, 1999;

"Processing Channel Subsystem Pending I/O Work Queues Based On Priorities," Maergner et al., Ser. No. 09/407,459, filed Sep. 28, 1999;

"Method, System And Program Products For Determining I/O Configuration Entropy," William J. Rooney, Ser. No. 09/407,453, filed Sep. 28, 1999;

"Method And Apparatus For Assigning Resources To Logical Partition Clusters," Rooney et al., Ser. No. 09/407,810, filed Sep. 28, 1999;

"Method And Apparatus For Creating And Identifying Logical Partition Clusters," Rooney et al., Ser. No. 09/407,514, filed Sep. 28, 1999;

"Method, System and Program Products For Managing I/O Configurations Of A Computing Environment," Cwiakala et al., Ser. No. 09/407,544, filed Sep. 28, 1999; and "Measuring Utilization Of Individual Components Of Channels," Glassen et al., Ser. No. 09/539,024, filed Mar. 30, 2000.

TECHNICAL FIELD

This invention relates, in general, to input/output (I/O) processing, and in particular, to projecting the impact of configuration changes on controllers.

BACKGROUND ART

The management of workload plays an important role in computing environments today. Thus, various aspects of processing within a computing environment are scrutinized to ensure a proper allocation of resources and to determine whether any constraints exist. One type of processing that is scrutinized is I/O processing.

In I/O processing, workload management includes properly allocating channels to control units. To determine whether the allocation is sufficient, channel delay is measured. Previously, the metric of channel delay included measuring the response times.

When it is determined that the allocation is insufficient, then various changes need to be made. The cost of making these changes is expensive and thus, a need exists for a technique for projecting the impact of configuration changes on the control units, prior to making the adjustments. In particular, a need exists for a capability that quantifies the impact of a change on one or more control units to be affected by that change.

SUMMARY OF THE INVENTION

The shortcomings of the prior art are overcome and additional advantages are provided through the provision of a method of projecting an impact of configuration changes on controllers. The method includes, for instance, selecting a controller associated with a configuration change; and projecting an impact of the configuration change on the controller, wherein the projecting quantifies the impact.

System and computer program products corresponding to the above-summarized methods are also described and claimed herein.

Advantageously, a capability is provided for quantifying the impact of configuration changes on controllers. The quantification provides numerical representations of the impact that a particular change has on one or more controllers associated with the change. These representations can be used to select a best option for making a configuration change.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OF THE INVENTION

In accordance with an aspect of the present invention, a capability is provided for determining whether a controller (e.g., a control unit) of a computing environment needs additional resources, such as input/output (I/O) resources (e.g., one or more channels). In making this determination, a metric representing the resource is calculated, as described herein.

Figure 1A:
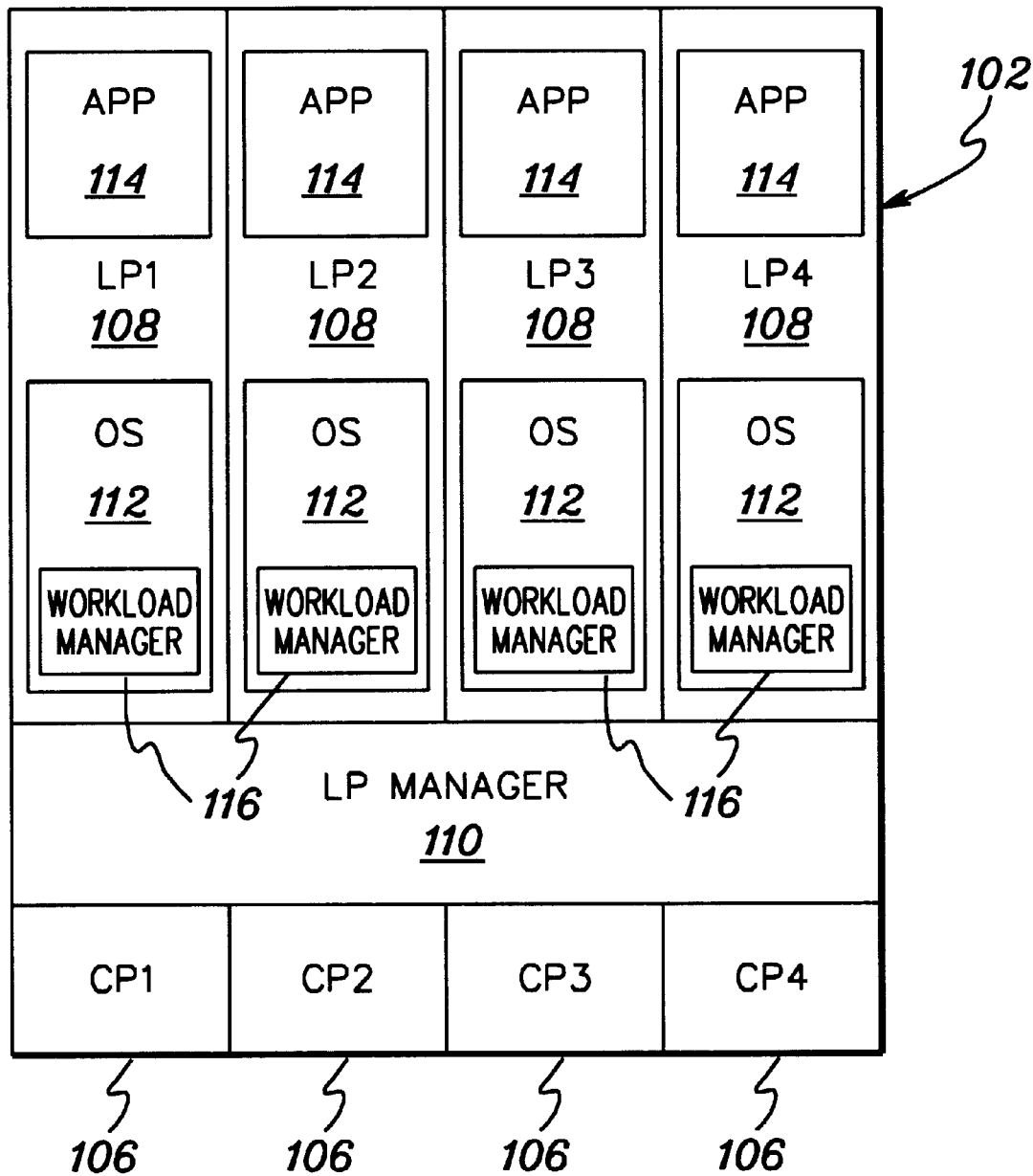
FIG. 1a depicts one example of a computing environment incorporating and using one or more aspects of the present invention.

One embodiment of a computing environment incorporating and using one or more aspects of the present invention is described with reference to FIG. 1a. A computing environment 100 is based, for instance, on the Enterprise Systems Architecture (ESA)/390 offered by International Business Machines Corporation, Armonk, N.Y. ESA/390 is described in an IBM publication entitled *Enterprise Systems Architecture/390 Principles Of Operation*, IBM Publication No. SA22-7201-06, July 1999, which is hereby incorporated herein by reference in its entirety. One example of a computing environment based on ESA/390 is the 9672 Parallel Enterprise Server offered by International Business Machines Corporation.

Computing environment 100 includes, for example, a central processor complex (CPC) 102 having one or more central processors 106 (e.g., CP1–CP4), one or more partitions 108 (e.g., logical partitions (LP1–LP4)), and at least one logical partition manager 110, each of which is described below.

Central processors 106 are physical processor resources that are allocated to the logical partitions. In particular, each logical partition 108 has one or more logical processors (not separately shown for clarity), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition).

In the particular example shown, each of logical partitions LP1–LP4 functions as a separate system having a resident operating system 112 (which may differ for each logical partition) and one or more applications 114. In one embodiment, operating system 112 is the OS/390™ operating system offered by International Business Machines Corporation.

Additionally, each operating system (or a subset thereof) includes a workload manager 116 for managing the workload within a partition and among partitions. One example of a workload manager is WLM offered by International Business Machines Corporation. WLM is described in, for instance, U.S. Pat. No. 5,473,773, Aman et al., entitled "Apparatus And Method For Managing A Data Processing System Workload According To Two Or More Distinct Processing Goals", issued Dec. 5, 1995; and U.S. Pat. No. 5,675,739, Eilert et al., entitled "Apparatus And Method For Managing A Distributed Data Processing System Workload According To A Plurality Of Distinct Processing Goal Types", issued Oct. 7, 1997, each of which is hereby incorporated herein by reference in its entirety.

Logical partitions 108 are managed by logical partition manager 110 implemented by microcode running on processors 106. Logical partitions 108 (LP1–LP4) and logical partition manager 110 each comprise one or more programs residing in respective portions of central storage associated with the central processors. One example of logical partition manager 110 is the Processor Resource/Systems Manager™ (PR/SM™), which is described, for instance, in the IBM publication *Processor Resource/Systems Manager Planning Guide*, GA22-7236-04, March 1999, which is hereby incorporated herein by reference in its entirety.

Examples of logically partitioned computing systems are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 08, 1996, each of which is hereby incorporated herein by reference in its entirety.

Figure 1B:
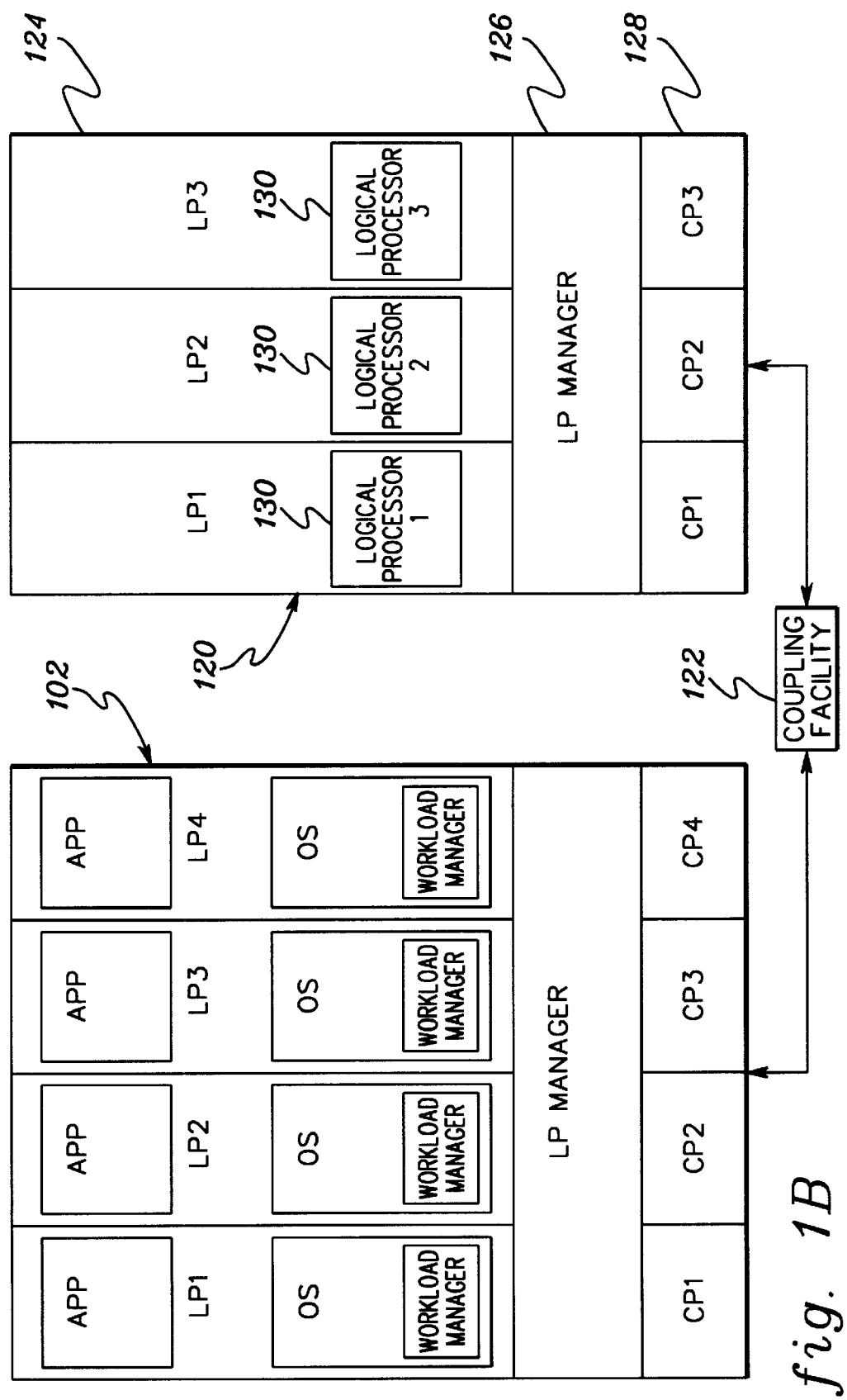
FIG. 1b depicts another embodiment of a computing environment incorporating and using one or more aspects of the present invention.

In a further embodiment of a computing environment, two or more central processor complexes are coupled to one another to form a sysplex, as depicted in FIG. 1b. As one example, a central processor complex (CPC) 102 is coupled to one or more other CPCs 120 via, for instance, a coupling facility 122.

In the example shown, CPC 120 includes a plurality of logical partitions 124 (e.g., LP1–LP3), which are managed by a logical partition manager 126. One or more of the logical partitions include an operating system, which may have a workload manager and one or more application programs (not shown in this example for clarity). Additionally, CPC 120 includes a plurality of central processors 128 (e.g., CP1–CP3), the resources of which are allocated among the plurality of logical partitions. In particular, the resources are allocated among one or more logical processors 130 of each partition. (In other embodiments, each CPC may have one or more logical partitions and one or more central processors.)

Coupling facility 122 (a.k.a., a structured external storage (SES) processor) contains storage accessible by the central processor complexes and performs operations requested by programs in the CPCs. (In one embodiment, each central processor complex is coupled to a plurality of coupling facilities.) Aspects of the operation of a coupling facility are described in detail in such references as Elko et al., U.S. Pat. No. 5,317,739 entitled "Method And Apparatus For Coupling Data Processing Systems", issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued Oct. 1, 1996; Elko et al., U.S. Pat. No. 5,706,432, entitled "Mechanism For Receiving Messages At A Coupling Facility", issued Jan. 6, 1998; and the patents and applications referred to therein, all of which are hereby incorporated herein by reference in their entirety.

Figure 2:
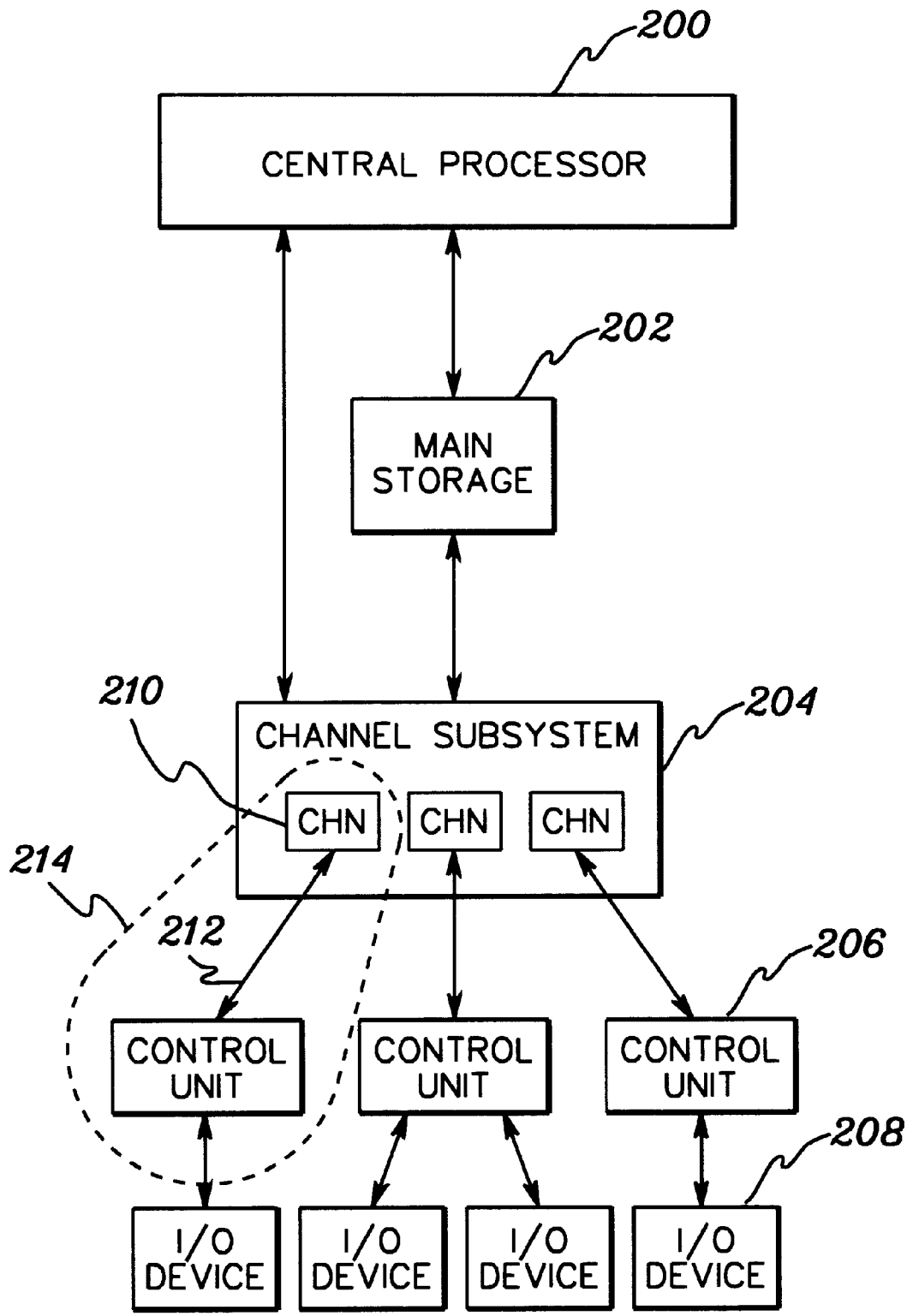
FIG. 2 depicts additional components of the computing environments of FIGS. 1a and 1b incorporating and using aspects of the present invention.

In one embodiment, one or more of the central processors are coupled to at least one channel subsystem, which is used in communicating with I/O devices. For example, a central processor 200 (FIG. 2) is coupled to main storage 202 and at least one channel subsystem 204. Channel subsystem 204 is further coupled to one or more control units 206. The control units are then coupled to one or more I/O devices 208.

The channel subsystem directs the flow of information between the input/output devices and main storage. It relieves the central processing units of the task of communicating directly with the input/output devices and permits data processing to proceed concurrently with input/output processing. The channel subsystem uses one or more channel paths 214 as communication links in managing the flow of information to or from input/output devices 208.

Each channel path 214 includes, for instance, a channel 210 of channel subsystem 204, a control unit 206 and a link 212 between the channel and control unit. In other embodiments, a channel path may have multiple channels, control units, and/or links. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled "Method And System For Pipelining The Processing Of Channel Command Words," issued on Jun. 11, 1996; and Glassen et al., Ser. No. 09/539,024, entitled "Measuring Utilization Of Individual Components Of Channels," filed Mar. 30, 2000, each of which is hereby incorporated herein by reference in its entirety.

The number of resources (e.g., channels) that are available for use by a controller (e.g, a control unit) can be dynamically adjusted to address changing requirements of the workload. In order to determine what adjustments are to be made, a metric of resource delay is employed. In one example, this metric is referred to as I/O velocity. The I/O velocity indicates, for instance, channel delay. It can be used, in one example, to determine whether a constraint (e.g., of communications bandwidth, such as channel bandwidth) exists on a controller (e.g., a control unit (CU)).

In accordance with an aspect of the present invention, an actual I/O velocity of a control unit is calculated using the following equation:

Control Unit I/O Velocity=ΣDevice Connect Times/(ΣDevice Connect Times+Σ(Pending Times−(CU Busy Times+Device Busy Times))), in which each device connect time reflects the amount of time that a channel of the control unit is actually being used; and the pending time indicates the time the control unit is waiting to use the channel because all of the channels the control unit has access to (e.g., up to 8 channels) are busy. The pending time includes a number of other busy indicators, including for instance, control unit busy and device busy, which are removed from the pending time, in this embodiment.

Figure 5A:
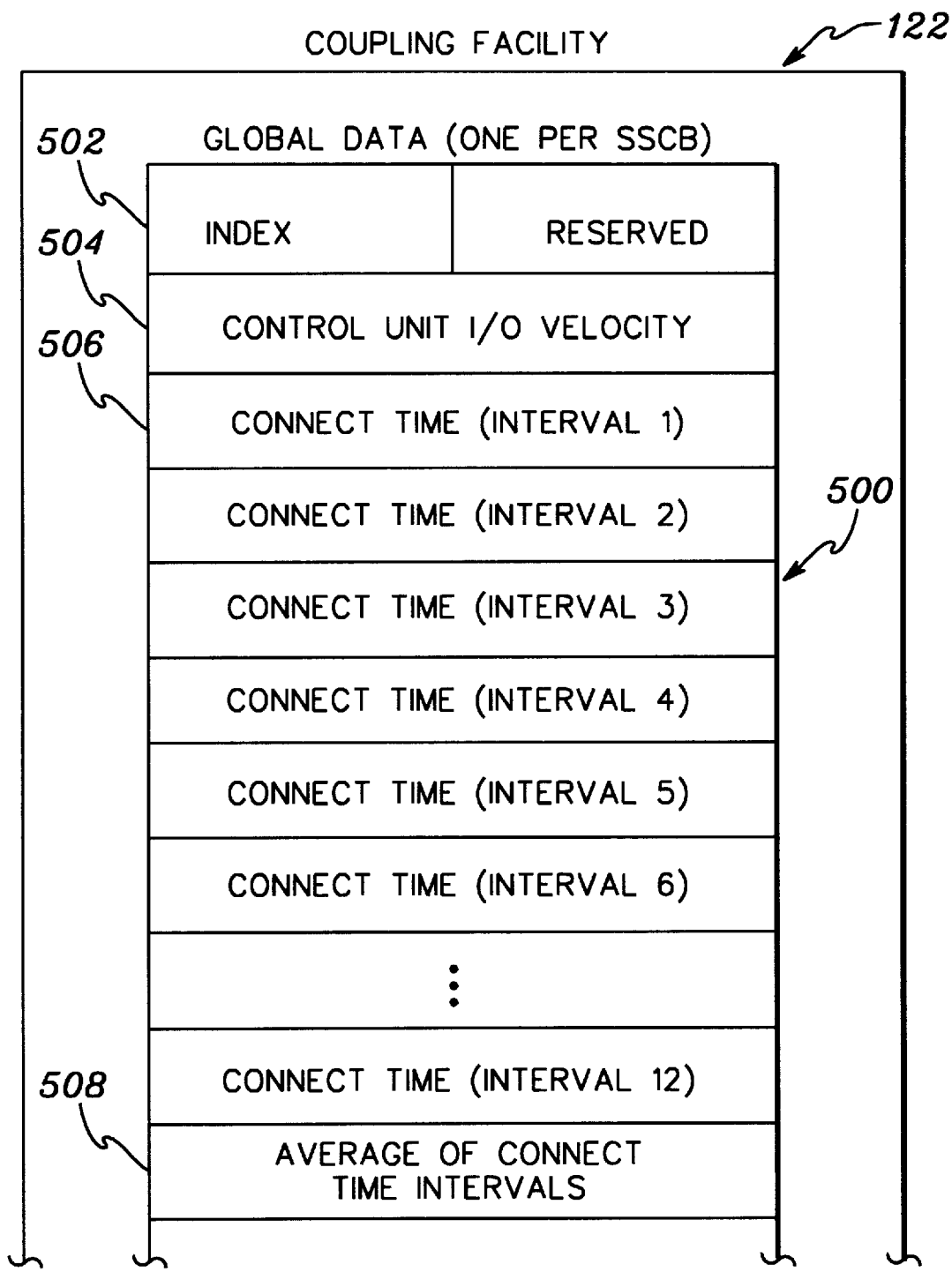
FIGS. 5a–5b depict one embodiment of a global data structure located within a coupling facility used to store the collected data, in accordance with an aspect of the present invention.
Figure 5B:
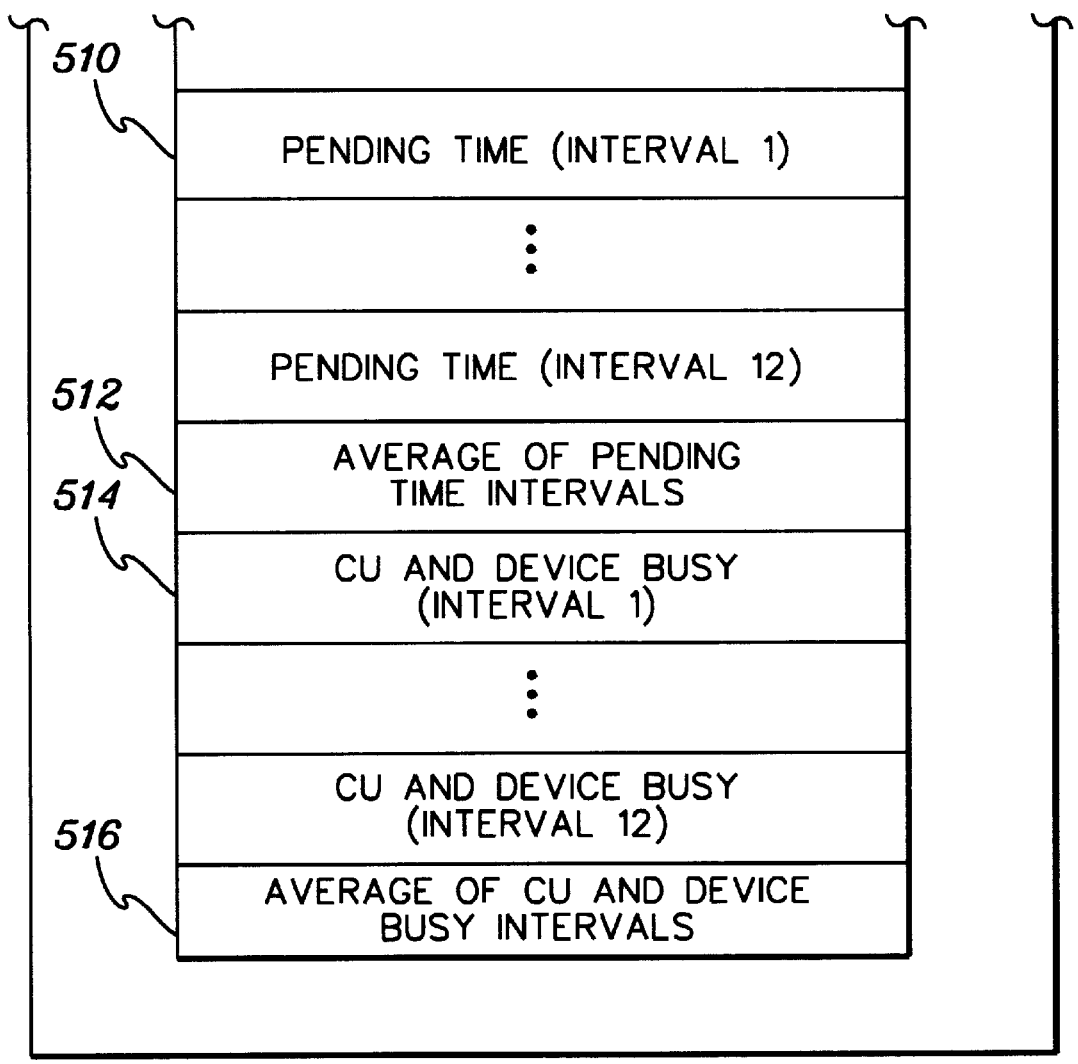
Figure 6:
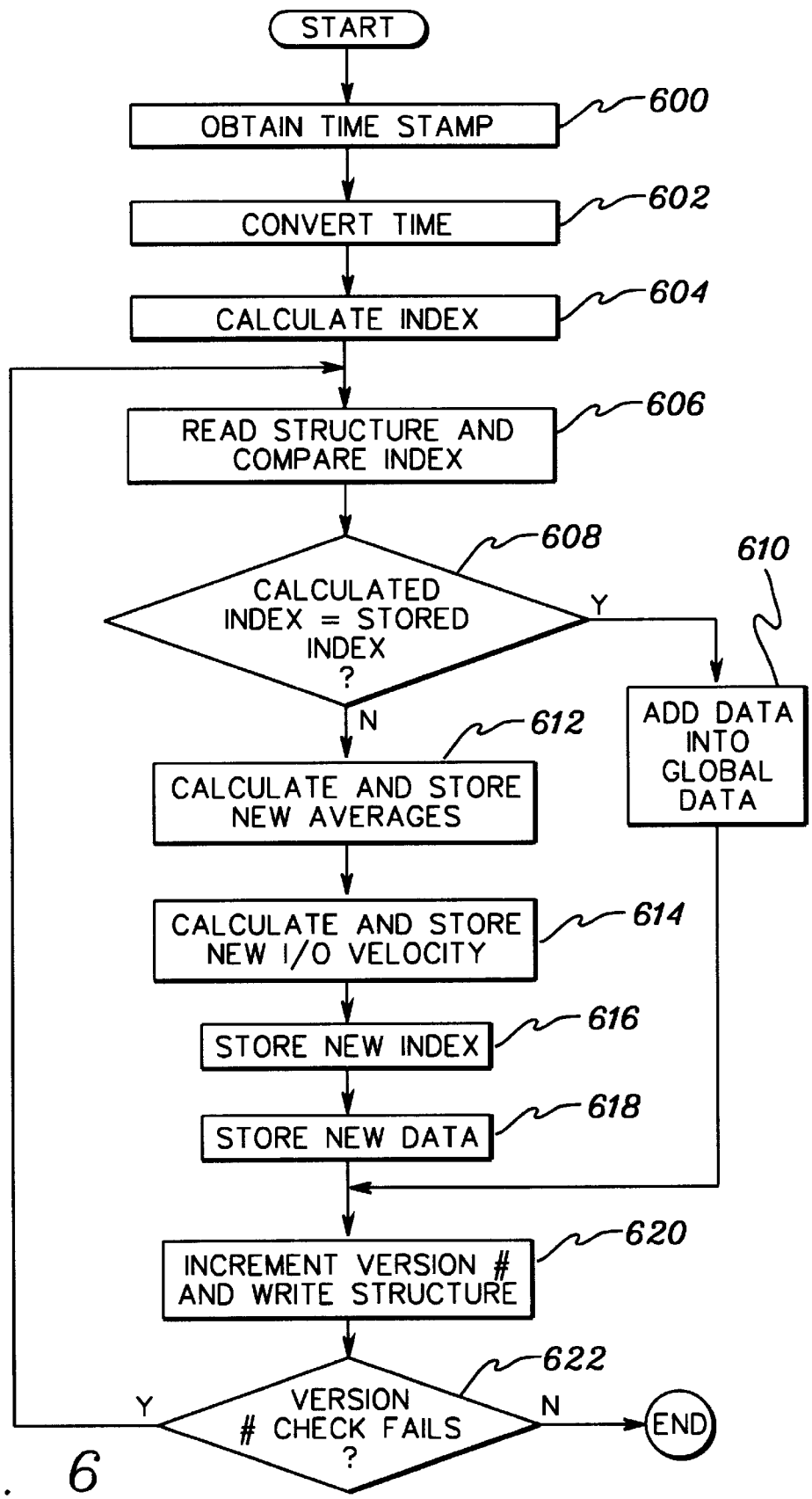
FIG. 6 depicts one embodiment of the logic associated with the storing of data of FIG. 3 and with calculating an actual I/O velocity, in accordance with an aspect of the present invention.

The various components of the control unit I/O velocity equation and use of the control unit I/O velocity are described in further detail with reference to FIGS. 3–6. In particular, FIG. 3 depicts an overview of the steps performed to determine whether a constraint on a controller exists, and FIGS. 4–6 provide additional details for those steps.

Figure 3:
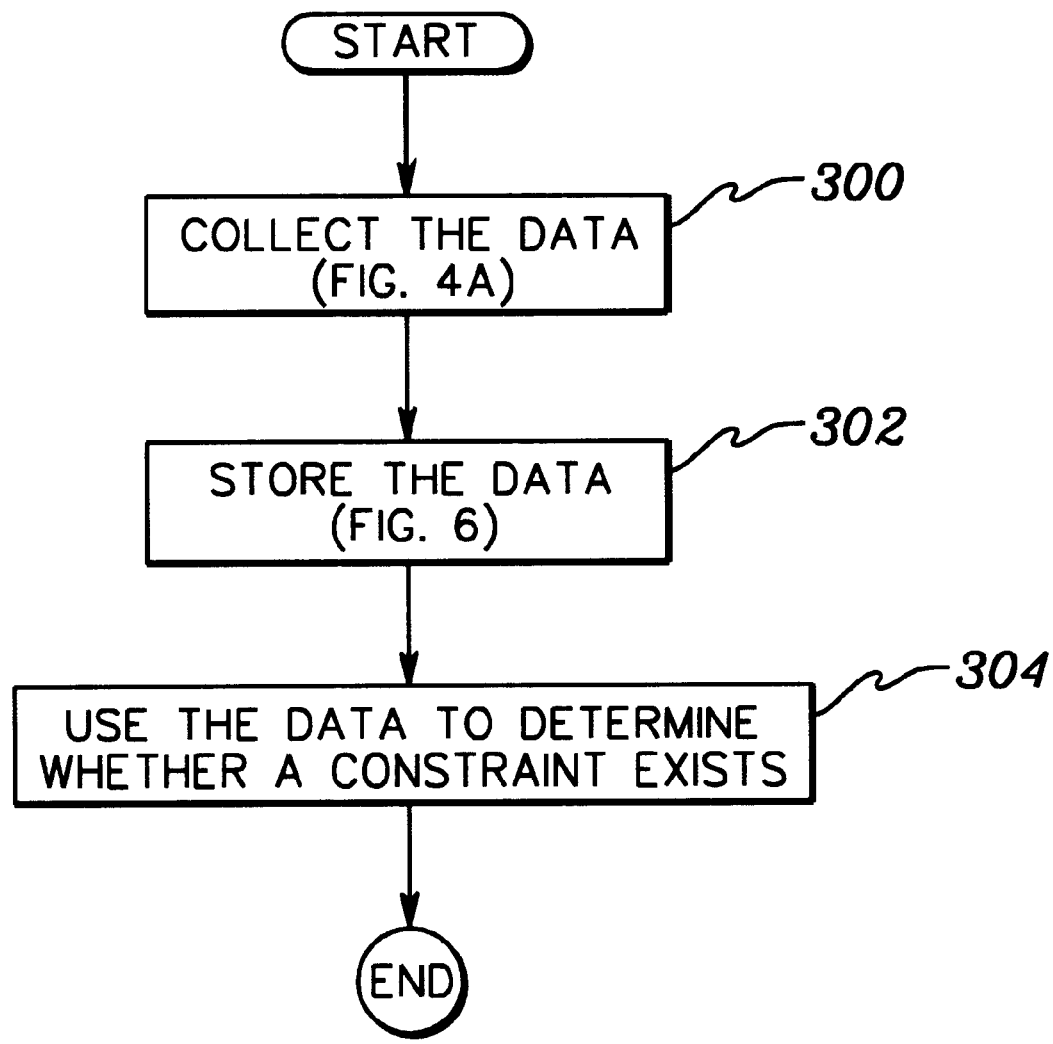
FIG. 3 depicts one embodiment of the overall logic associated with determining controller I/O velocity and using the controller I/O velocity to determine whether a controller constraint exists, in accordance with an aspect of the present invention.

Referring to FIG. 3, initially, data is collected from the systems that access the control unit, STEP 300 (FIG. 3). For example, if the computing environment is a partitioned environment, then data is collected from all of the partitions that access the control unit. In one instance, the data is collected by an I/O Supervisor (IOS) of the operating system.

The I/O Supervisor then passes the data to a workload manager (e.g., WLM), which stores the data in, for instance, a coupling facility, STEP 302. This storing of the data in the coupling facility allows the creation of a clustered LPAR-wide view of the data used to calculate the actual I/O velocity. (An LPAR cluster is, for instance, a set of partitions running on a single CPC that are all members of the same sysplex.)

The stored data, which includes the actual control unit I/O velocity, is then capable of being used to determine whether a constraint exists for a control unit of the computing environment, STEP 304.

Figure 4A:
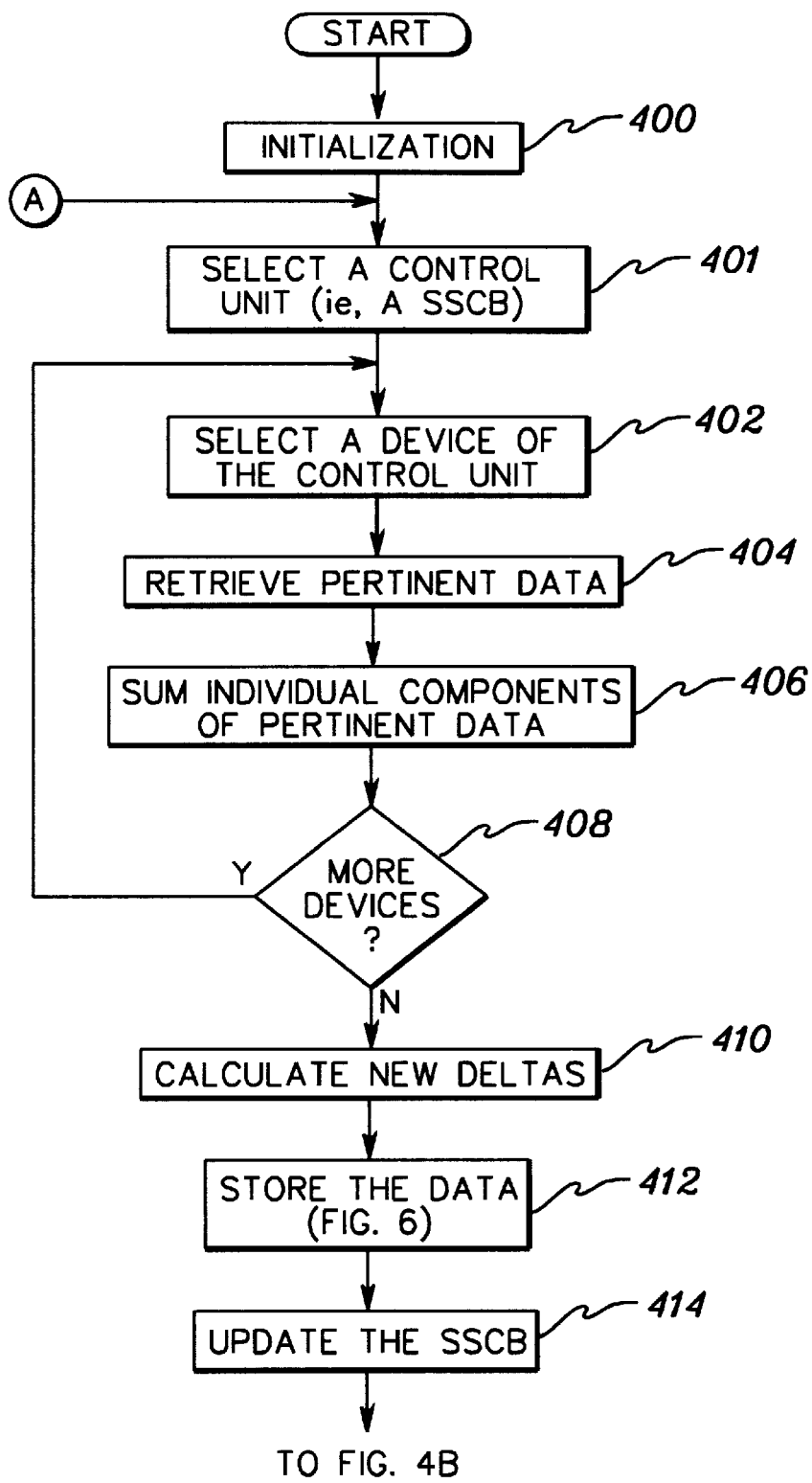
FIGS. 4a–4b depict one embodiment of the logic associated with the collection of data of FIG. 3 and with determining a default I/O velocity, in accordance with an aspect of the present invention.
Figure 4B:
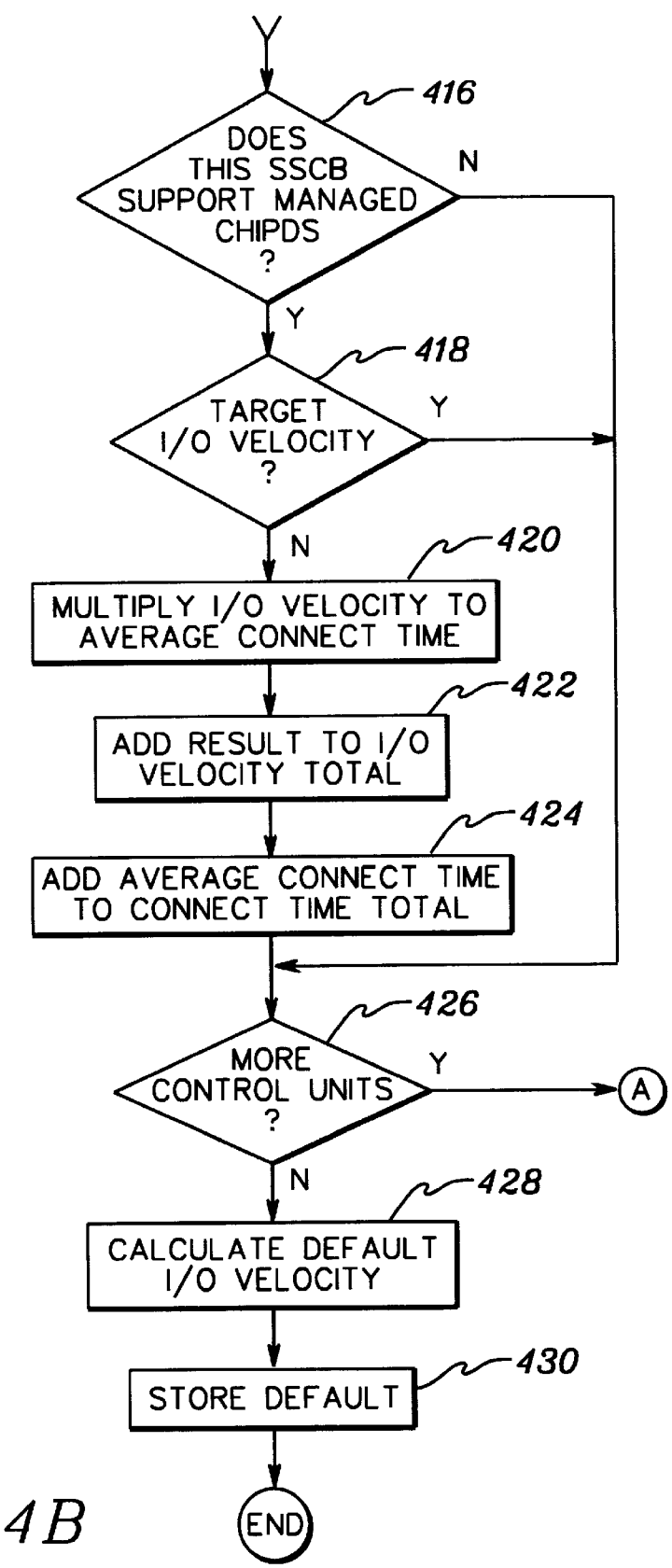

One embodiment of collecting the data is described in further detail with reference to FIGS. 4a–4b. The logic of FIGS. 4a–4b is performed by IOS, when invoked by, for instance, a workload manager at predefined intervals (e.g., every ten seconds). When the logic is invoked, some initialization is performed, STEP 400. For instance, a workarea in local memory of the system running the logic is cleared, and two variables, I/O Velocity Total and Connect Time Total, are set to zero.

Thereafter, since data is collected for each device of each control unit of a cluster, a control unit is selected, STEP 401. In particular, in one instance, a subsystem control block (SSCB) representing a control unit is selected. Thus, the first subsystem control block on a chain of SSCBs is selected, which identifies the control unit for which data is being collected.

Subsequently, a device of that control unit is selected for processing, STEP 402. In one example, the list of devices for a control unit is obtained using its associated SSCB. Then, pertinent data for that device is obtained, STEP 404. For instance, the pending time and connect time are extracted from a measurement block (a.k.a., a channel measurement block (CMB)) updated by its associated channel(s). The channel measurement block keeps accumulated data of various times, including device connect time and pending time.

Additionally, the control unit busy time and device busy time are obtained via, for instance, issuing a Store Subchannel instruction (STSCH). Examples of a measurement block and a Store Subchannel instruction are described in the aforementioned *Enterprise Systems Architecture/390 Principles of Operation*, which has been incorporated herein by reference in its entirety.

Running totals of pending time, device connect time, control unit busy time and device busy time are maintained for the devices of the current control unit, STEP 406. Thus, the pending time retrieved for the current device is added to the sum of pending times for any other devices of this control unit already processed. Likewise, the device connect time for this device is added to a total device connect time for the control unit; the control unit busy time is added to a total control unit busy; and a device busy time is added to a total device busy.

Next, a determination is made as to whether there are more devices for this SSCB, INQUIRY 408. If there are more devices, then processing continues with STEP 402, as described above. However, if there are no more devices for this SSCB, then processing proceeds with calculating new deltas, STEP 410. In particular, since each of the retrieved values represents an accumulation of values, a calculation is performed to determine how much has changed since the last calculation. For example, the last value for a particular component (e.g., device connect time, pending time, control unit busy time and device busy time) stored in the SSCB is subtracted from its corresponding new value to determine the delta.

Thereafter, the data is stored, for instance, in the coupling facility in order to provide in this example an LPAR cluster-wide view of the data, STEP 412. One example of storing the data in the coupling facility is described further below with reference to FIG. 6.

Subsequent to storing the data in the coupling facility, the SSCB is updated with the new last values, STEP 414. In particular, the last values for the device connect time, pending time, control unit busy time and device busy time are stored in the SSCB.

After updating the SSCB with the new last values, a determination is made as to whether this SSCB supports managed channel paths, INQUIRY 416 (FIG. 4b). In one example, this determination is made by checking a mask in the SSCB. If this control unit supports managed channel paths, then a further determination is made as to whether a target I/O velocity is specified in the SSCB, INQUIRY 418. If managed channel paths are supported and no target I/O velocity is specified, then this SSCB is used to calculate a default I/O velocity. In order to make this calculation, first the I/O velocity returned from the service writing the data into the coupling facility, as described below, is multiplied by an average connect time returned, STEP 420. The result of that multiplication is then added to the I/O velocity total, STEP 422. Additionally, the average connect time is added to the connect time total, STEP 424.

Subsequently, a determination is made as to whether there are more control units to be processed, INQUIRY 426. If there are more control units to be processed, then processing continues with STEP 401 (FIG. 4a) selecting a control unit. However, if there are no more control units to be processed, then the default I/O velocity to be used by all the control units that do not indicate a target I/O velocity (and support managed channels) is calculated, STEP 428. In one example, the default I/O velocity is equal to the I/O velocity total divided by the connect time total. (In the case where either no controllers had managed channels or all have an explicit target I/O velocity, then the default is set to a value, such as 100.) This default is then stored in a control block that is commonly accessible to IOS, STEP 430. In one example, this commonly accessible control block is referred to as a Dynamic CHPID Management Vector Table (DCMVT).

As described above, in order to provide an LPAR cluster-wide view of the data, the data is stored in the coupling facility. In one example, various components of the data are stored in a global data structure located within the coupling facility, as shown in FIGS. 5a–5b. In one example, there is one global data structure per SSCB. The global data structure contains device connect times for a plurality of intervals (e.g., twelve). This enables decisions to be based on a moving average.

A global data structure 500 includes, for instance, an index 502 used to indicate the current interval; a control unit I/O velocity field 504 for storing the calculated actual control unit I/O velocity; a plurality of connect times 506, one for each of the plurality of intervals (e.g., intervals 1–12); an average of connect time intervals field 508, which indicates an average of eleven of the twelve intervals; a plurality of pending times 510, one for each of the plurality of intervals; an average of pending time intervals field 512 that includes an average of eleven of the twelve pending time intervals; and a plurality of control unit plus device busy times 514, one for each interval; and an average of CU+device busy intervals field 516, which indicates an average of eleven of the twelve CU+device busy intervals.

One embodiment of the logic associated with storing data in the coupling facility is described with reference to FIG. 6. Initially, a time stamp is obtained, STEP 600. The time from the time stamp is then converted to tens of seconds, STEP 602. Thereafter, an index is calculated by taking modulo 12 of the time in tens, STEP 604.

Subsequently, the global data structure of the coupling facility is read into local memory and the index that was just calculated is compared to the index stored in the global data structure, STEP 606. If the calculated index is equal to the stored index indicating that a new interval is not being started, INQUIRY 608, then the pertinent data is added to the global data structure, STEP 610. In particular, the connect time, the pending time, the control unit busy time and the device busy time are added to the values already stored at those fields in the appropriate interval.

However, if the calculated index is not equal to the stored index, this indicates that a new interval is being started. Thus, certain information is calculated for the current interval that recently ended. For example, an average connect time is calculated using 11 of the 12 intervals (the new interval is left out), STEP 612, and that average is stored at average of intervals field 508. Similarly, an average of pending time is calculated using 11 of the 12 intervals, and that average is stored at average of pending time intervals 512; and an average of CU+busy time is calculated and stored in field 516. Additionally, a new control unit I/O velocity is calculated and stored at field 504, STEP 614. In particular, the actual I/O velocity is determined by using the control unit I/O velocity equation described above. In that equation, ΣDevice Connect Times is set equal to the average of intervals 508, ΣPending Times is set to average of pending time intervals 512, and ΣCU Busy Times and Device Busy Times is set to average of CU and device busy intervals 516.

Further, the new index that was calculated at STEP 604 is now stored at field 502, STEP 616. Additionally, the new data (e.g., the connect time, control unit and device busy times, and pending time) are stored in their respective fields for the new interval, STEP 618.

Thereafter, a version number associated with the data structure is incremented, and a writing of the data structure to the coupling facility from local memory is initiated, STEP 620. During this initiation, if the version number check fails, INQUIRY 622, then processing continues with STEP 606 and the data structure is not written to the coupling facility. Otherwise, the global data structure is written to the coupling facility. Further, the I/O velocity and average connect time are returned to the caller.

At this point, an actual control unit I/O velocity has been determined for each of the desired control units. Each control unit I/O velocity provides a metric of channel delay, which may be used to set channel bandwidth consumption targets for individual control units. In one example, the target for a control unit is the default calculated above or an explicit target specified by WLM. Further, in another embodiment, a fixed value may be used.

A balance checking service may then be invoked by the workload manager at predetermined intervals (e.g., every ten seconds) (or the logic of FIGS. 4a–4b automatically flow into the balance checking service) to determine if any of the control units are not achieving their target I/O velocity. In particular, if any of the control units are found outside of a tolerance of, for instance, plus or minus 5 percentage points of the target I/O velocity, an imbalance correction function is executed in an attempt to place the control unit within range. One embodiment of an imbalance correction technique is described in detail in Cwiakala et al., Ser. No. 09/407,544, entitled "Method, System and Program Products For Managing I/O Configurations Of A Computing Environment," filed Sep. 28, 1999, which is hereby incorporated herein by reference in its entirety.

In the imbalance correction technique, each control unit failing to meet the target, referred to herein as the target control unit, has associated therewith one or more decision selection blocks (DSBs), each of which represents a different possible solution (e.g., a different configuration). Further, each DSB includes a list of one or more control units that would be affected by the change represented by that DSB.

For the target control unit and each affected control unit of a DSB (collectively referred to herein as affected control units), a projected adjusted I/O velocity technique is invoked, in accordance with an aspect of the present invention, in order to determine a projected adjusted I/O velocity for each of the affected control units of the DSB should the configuration be adopted. The projected I/O velocities resulting from the invocation of the routine are stored in the DSB. This information is then used to select the best option for the target control unit within the tolerance of the target I/O velocity.

Figure 7:
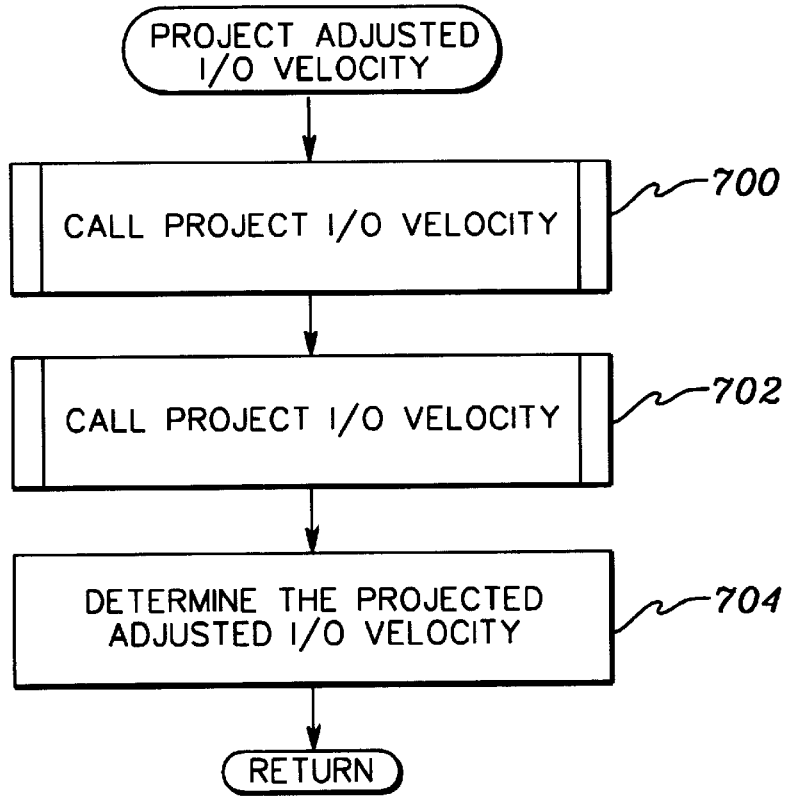
FIG. 7 depicts one embodiment of the logic associated with projecting an adjusted I/O velocity, in accordance with an aspect of the present invention.

One embodiment of the logic associated with projecting adjusted I/O velocities for affected control units of a DSB is described with reference to FIG. 7. Initially, a project I/O velocity routine (described below) is invoked in order to project the I/O velocity for the control units based on the current I/O configuration, STEP 700. That is, the project I/O velocity routine is executed for the current configuration in order to obtain one or more base numbers (i.e., one or more base I/O velocities) to be used later on for comparison. Subsequent to projecting the I/O velocity for the current I/O configuration, the project I/O velocity routine is invoked for the control units, once again. This time it is executed for a proposed I/O configuration associated with the DSB, STEP 702. Thereafter, a projected adjusted I/O velocity for each control unit of the DSB is determined using the projected I/O velocity values obtained from the two executions of project I/O velocity, STEP 704. In one example, the projected adjusted I/O velocity for a particular control unit is obtained by calculating the delta of the two values (i.e., the project I/O velocity of the proposed configuration—the project I/O velocity of the current configuration) and adding the delta to the actual I/O velocity of the current configuration previously determined for the control unit. This value is placed in the DSB corresponding to the control unit.

One example of the details associated with projecting I/O velocities for affected control units is described with reference to FIG. 8. Initially, the utilization of the channels associated with a configuration (initially for the current configuration and later for the proposed configuration of the target control unit) are projected, STEP 800. To project the channel utilizations for the configuration, the corresponding I/O topology is looked at and the adjusted control unit load on the affected control units, described below, is used.

In one embodiment, the project channel utilization logic processes control units with the least number of channels first. In case of multiple control units with the same number of channels, those control units with the least load (i.e., total connect time) are processed first. However, the logic has no order dependency on processing the channels.

Further details regarding the projecting of channel utilizations is described with reference to FIG. 9. In the description of this logic, a "." notation is used, which indicates a value for a particular component specified after the ".". For instance, failed load.CU indicates there is a failed load value for each control unit of interest.

Figure 9:
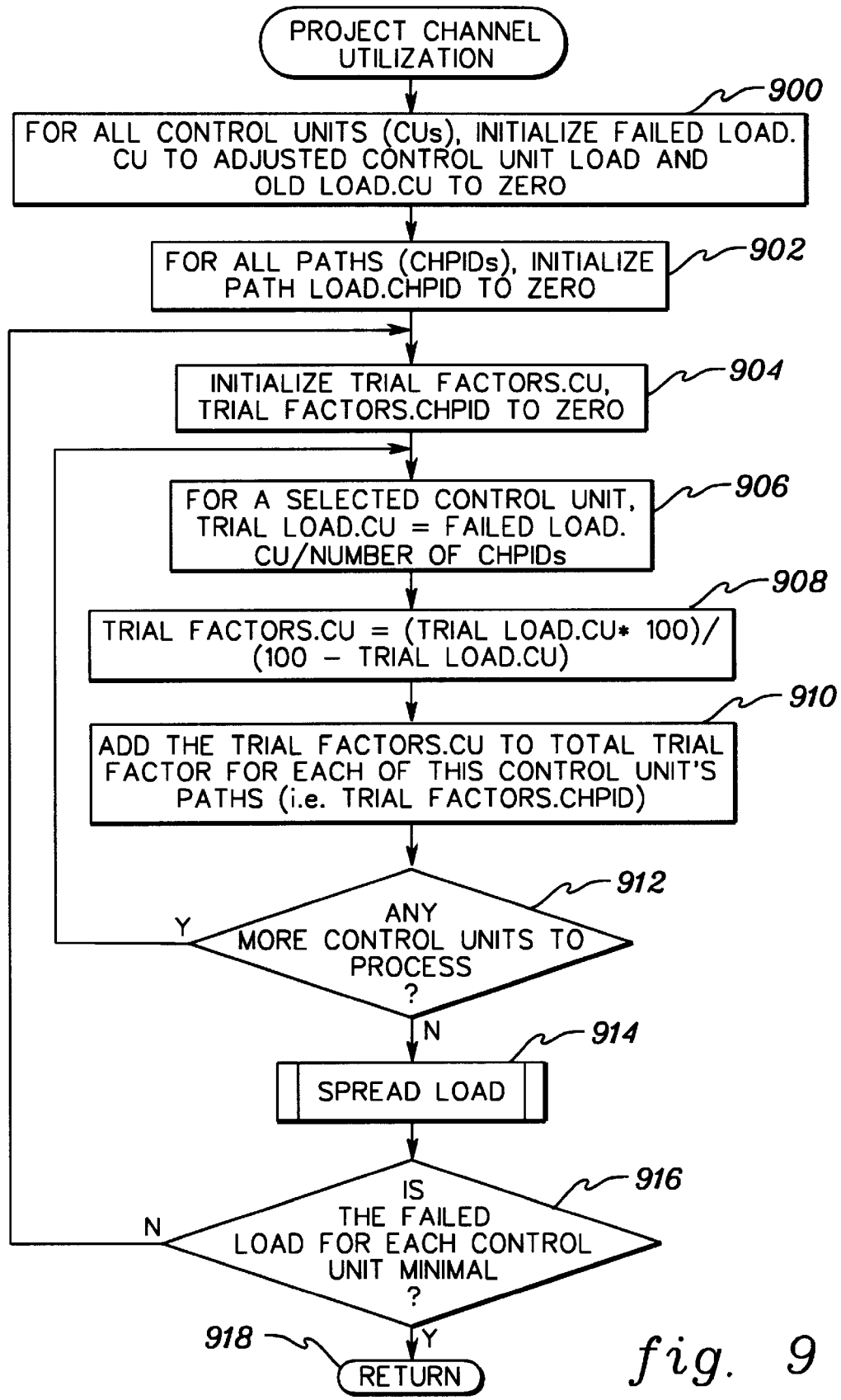
FIG. 9 depicts one embodiment of the logic associated with the project channel utilization of FIG. 8, in accordance with an aspect of the present invention.

Referring to FIG. 9, initially, for each control unit affected by the configuration, a variable referred to as old load.CU is initialized to zero, and another variable referred to as failed load.CU is initialized to an adjusted control unit load, STEP 900. In order to determine an adjusted control unit load, the logic of FIG. 10 is employed.

Figure 10:
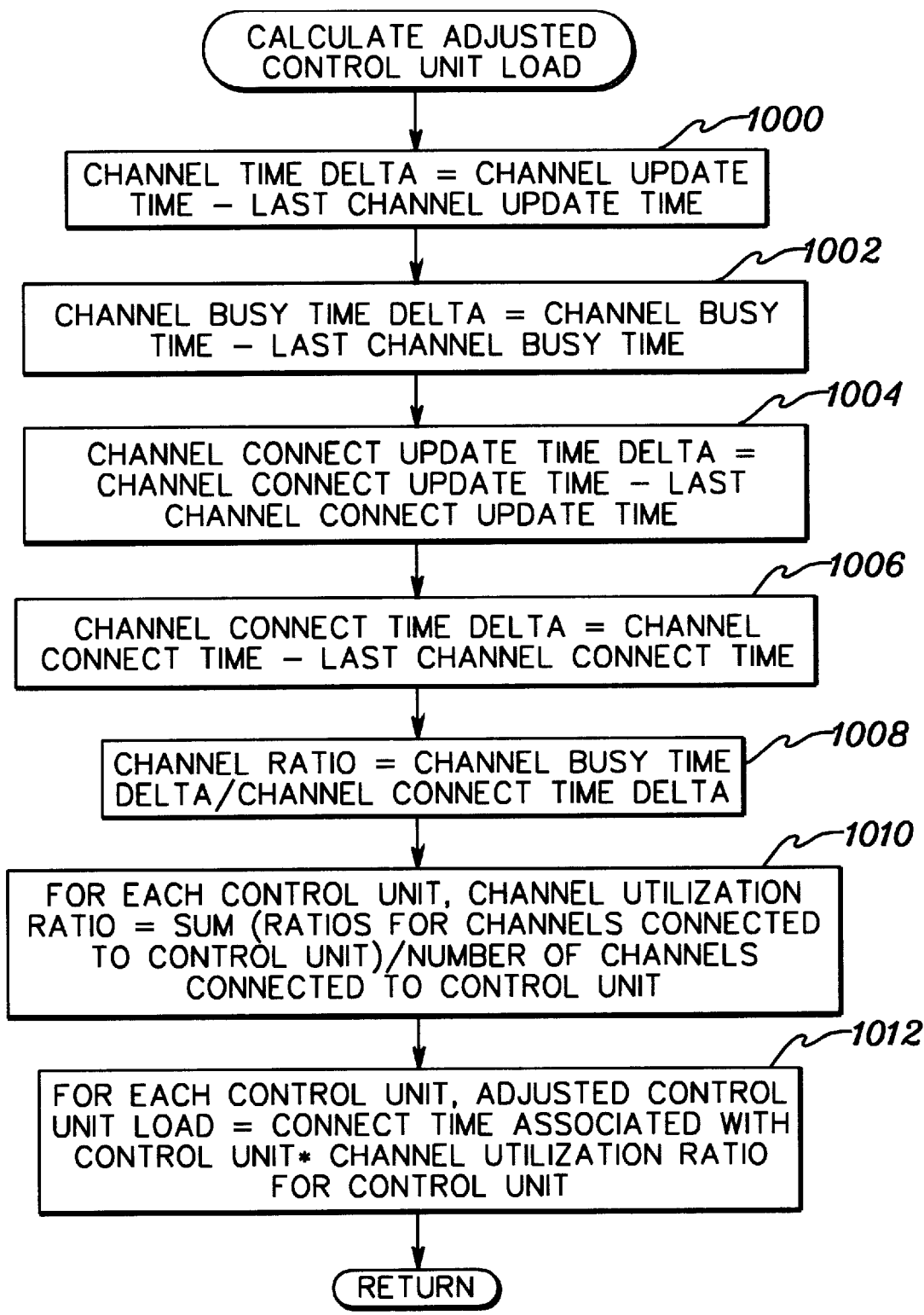
FIG. 10 depicts one embodiment of the logic associated with calculating adjusted control unit loads, in accordance with an aspect of the present invention.

Referring to FIG. 10, at predefined intervals, one or more counts are taken, which are used during the calculations. In order to obtain a desired count for a particular interval, a timestamp associated with the interval is determined. For example, a channel time delta is set equal to a channel update time, which is retrieved from a facility (e.g., a Channel Path Measurement Facility (CPMF)), minus the last channel update time, which is stored in memory, STEP 1000. This provides a timestamp for the last interval. For this interval, a channel busy time delta is set equal to a channel busy time (retrieved from CPMF) minus the last channel busy time, STEP 1002. (One example of CPMF is described in Glassen et al., Ser. No. 09/539,024, entitled "Measuring Utilization Of Individual Components Of Channels", filed Mar. 30, 2000, which is hereby incorporated herein by reference in its entirety.)

Additionally, a channel connect update time delta is set equal to the channel connect update time minus the last channel connect update time to obtain an interval for channel connect time. Then, a channel connect time delta is set equal to a channel connect time minus the last channel connect time, which provides an amount of connect time associated with the data transfer that occurred in the last interval. (In one example, the connect time is being accumulated in a table (e.g., a Channel Path Connect Table, where it is accumulated I/O by I/O from the CMB), and the timestamp is associated therewith.)

Thereafter, a channel ratio is determined by dividing the channel busy time delta by the channel connect time delta, STEP 1008. Using the above calculations, a channel ratio is determined for each channel of each control unit of the current DSB.

Subsequently, for each control unit, a channel utilization ratio is determined, STEP 1010. In one example, the channel utilization ratio is determined by adding the ratios for the channels connected to the control unit to obtain a sum, and dividing the sum by the number of channels connected to the control unit. Additionally, for each control unit, an adjusted control unit load is determined, STEP 1012. In one example, the adjusted control unit load is equal to the average connect time associated with the control unit (i.e., a sum of the 11 intervals of connect times for the control unit divided by 11) multiplied by the channel utilization ratio for the control unit. This provides the adjusted control unit loads employed by the project channel utilization routine.

Returning to FIG. 9, subsequent to initializing the failed load.CU to the adjusted control unit load for all the affected control units of this configuration, processing continues with initializing a variable referred to as path load.CHPID to zero for all paths (e.g., CHPIDs), STEP 902. Moreover, variables referred to as trial factors.CU and trial factors.CHPID are initialized to zero for all of the control units and channels, respectively, of all of the affected control units, STEP 904.

Next, a control unit is selected to be processed, and for that control unit, a variable referred to as trial load.CU is set equal to the failed (or unassigned) load.CU/number of channel paths for that control unit, STEP 906. Further, the trial factor for the control unit is determined, STEP 908. In one example, trial factors.CU is set equal to (trial load.CU× 100)/(100–trial load.CU). Thereafter, trial factors.CU is added to the total trial factor for each of the subsystem's paths (i.e., trial factors.CHPID), STEP 910.

Figure 11:
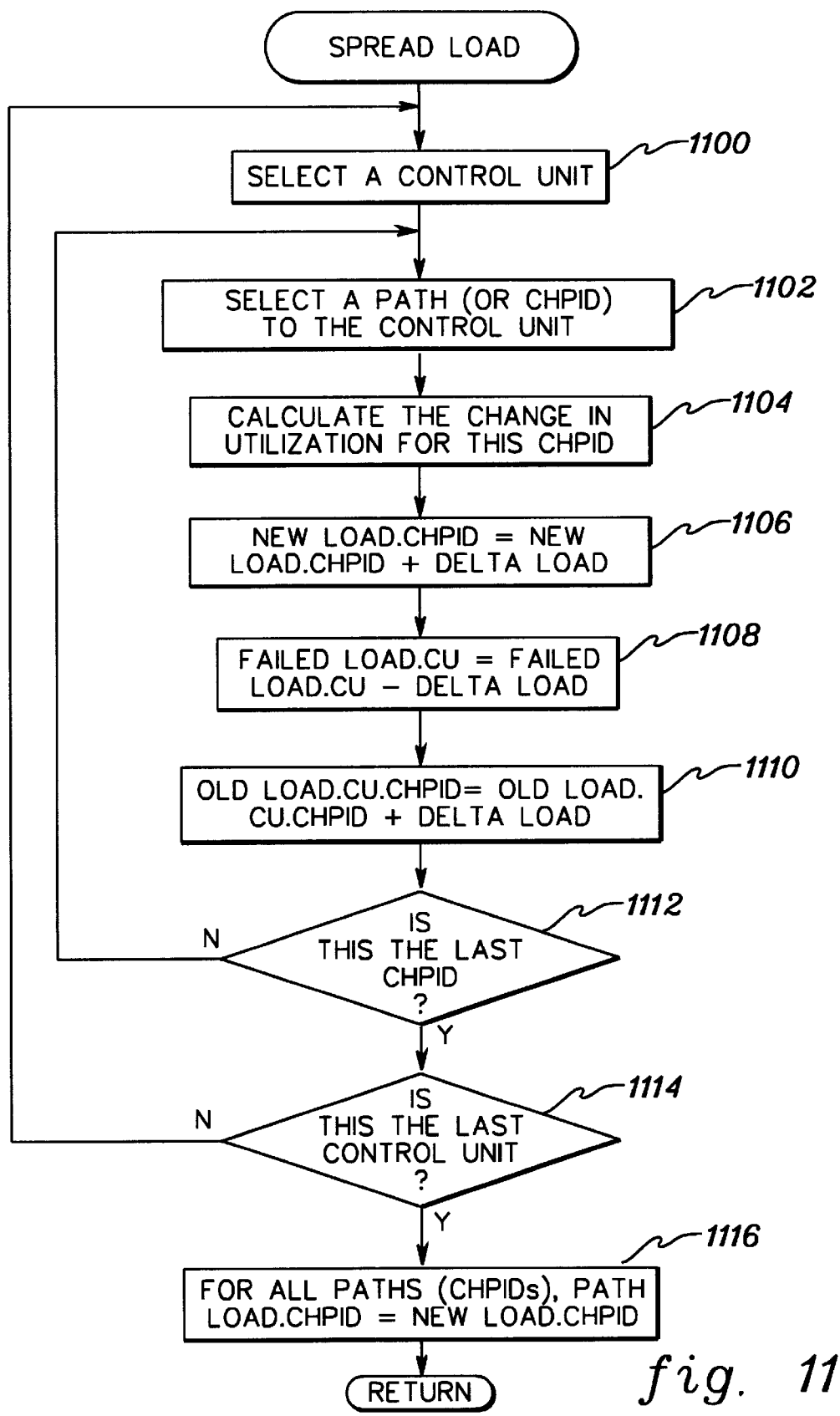
FIG. 11 depicts one embodiment of the logic associated with spreading the load, in accordance with an aspect of the present invention.

Subsequently, a determination is made as to whether there are any more control units to process, INQUIRY 912. If there are more control units to process, then processing continues with STEP 906. However, if there are no more control units to process, then a spread load function is invoked, STEP 914. One embodiment of the logic associated with the spread load function is described below with reference to FIG. 11.

The spread load logic is performed for each control unit of the DSB and for each path within the control unit. Thus, initially the control unit is selected, STEP 1100, and a path within the control unit is selected, STEP 1102.

For the selected path within the control unit, the change in utilization for this CHPID is calculated, STEP 1104. One example of this calculation is as follows: Delta Load=((100– path load.CHPID)×trial factors.CU)/(100+trial factors.CHPID), in which the values of the variables are obtained from the project channel utilization logic.

Thereafter, the new load for the path is calculated by adding the delta load to the new load.CHPID (i.e., new load.CHPID=new load.CHPID+delta load), STEP 1106. Further, the failed load and old load for the control unit are calculated, respectively. For instance, failed load.CU=failed load.CU–delta load, STEP 1108, and old load.CU.CHPID= old load.CU.CHPID+delta load, STEP 1110.

Subsequently, a determination is made as to whether this is the last CHPID attached to this control unit, INQUIRY 1112. If this is not the last CHPID, then processing continues with STEP 1102. However, if this is the last CHPID of the selected control unit, then a determination is made as to whether this is the last control unit in this DSB, INQUIRY 1114. If this is not the last control unit, then processing continues with STEP 1100. However, if this is the last path of the last control unit, then for each path (i.e., CHPID), its respective path load.CHPID is set equal to the new load.CHPID, STEP 1116.

Referring back to FIG. 9, after performing the spread load, a determination is made as to whether the failed load for each control unit of the DSB is minimal (e.g., within 0.5%, or approaching zero), INQUIRY 916. If the failed load for each control unit is not minimal, then processing continues with STEP 904. Otherwise, processing of the project channel utilization is complete, STEP 918. The path load- .CHPID represents the projected channel utilization for the corresponding path.

Figure 8:
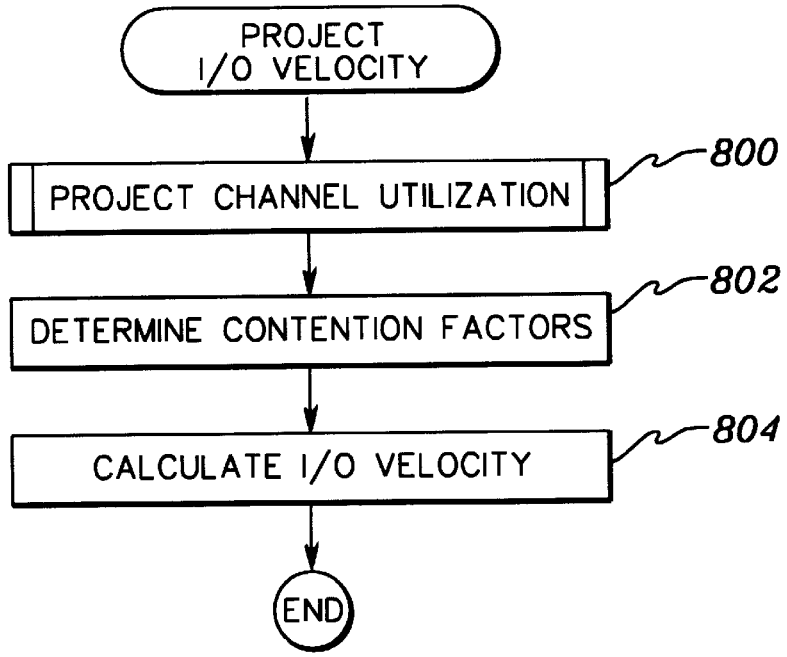
FIG. 8 depicts one embodiment of the logic associated with the project I/O velocity invocation of FIG. 7, in accordance with an aspect of the present invention.

After completing the project channel utilizations, processing continues with determining contention factors, STEP 802 (FIG. 8). In one example, a contention factor is defined as: Given a control unit with N channels at a given utilization, the contention factor for the control unit is the single channel equivalent utilization yielding an equal probability that an I/O request to that control unit would wait. The contention factors are determined using the projected channel utilizations and the configuration (either the current or proposed configuration).

A contention factor is determined for each control unit in the DSB, one at a time. For example, assume that a Control Unit 220 is connected to 4 CHPIDs having the following projected utilizations:

| CHPID | UTILIZATION |
|---|---|
| 20 | 40% |
| 37 | 42% |
| 48 | 29% |
| 73 | 33% |

In one example, the CHPIDs connected to the control unit are sorted from lowest to highest projected utilization.

| CHPID | UTILIZATION |
|---|---|
| 48 | 29% |
| 73 | 33% |
| 20 | 40% |
| 37 | 42% |

Then, average utilizations are calculated based on the utilization of the first CHPID in the list, then the average of the first two CHPIDs in the list, and so on down the list.

| CHPID | UTILIZATION | AVERAGE UTILIZATION |
|---|---|---|
| 48 | 29% | 29% |
| 73 | 33% | 31% |
| 20 | 40% | 34% |
| 37 | 42% | 36% |

Each of the average utilizations is then applied to a table to determine its corresponding contention factor. If the exact utilization is not in the table, then an interpolation is performed. One example of the table is depicted below:

Single CHPID Equivalent Utilization Yielding Equal Probability Of Waiting (Contention Factor)

| Avg util | Number of CHPIDs | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 5 | 5 | 0 | 0 | 0 | 0 | 0 | 0 | 0 |
| 10 | 10 | 2 | 0 | 0 | 0 | 0 | 0 | 0 |
| 15 | 15 | 4 | 1 | 0 | 0 | 0 | 0 | 0 |
| 20 | 20 | 7 | 2 | 1 | 0 | 0 | 0 | 0 |
| 25 | 25 | 10 | 4 | 2 | 1 | 0 | 0 | 0 |
| 30 | 30 | 14 | 7 | 4 | 2 | 1 | 1 | 0 |
| 35 | 35 | 18 | 10 | 6 | 4 | 2 | 1 | 1 |
| 40 | 40 | 23 | 14 | 9 | 6 | 4 | 3 | 2 |
| 45 | 45 | 28 | 19 | 13 | 9 | 7 | 5 | 3 |
| 50 | 50 | 33 | 24 | 17 | 13 | 10 | 8 | 6 |
| 55 | 55 | 39 | 29 | 23 | 18 | 14 | 12 | 9 |
| 60 | 60 | 45 | 35 | 29 | 24 | 20 | 17 | 14 |
| 65 | 65 | 51 | 42 | 35 | 30 | 26 | 23 | 20 |
| 70 | 70 | 58 | 49 | 43 | 38 | 34 | 30 | 27 |
| 75 | 75 | 64 | 57 | 51 | 46 | 42 | 39 | 36 |
| 80 | 80 | 71 | 65 | 60 | 55 | 52 | 49 | 46 |
| 85 | 85 | 78 | 73 | 69 | 65 | 62 | 60 | 57 |
| 90 | 90 | 85 | 82 | 79 | 76 | 74 | 72 | 70 |
| 95 | 95 | 93 | 91 | 89 | 88 | 87 | 85 | 84 |
| 100 | 100 | 100 | 100 | 100 | 100 | 100 | 100 | 100 |

The result of the table look-up is:

| CHPID | UTILIZATION | AVERAGE UTILIZATION | CONTENTION FACTOR |
|---|---|---|---|
| 48 | 29% | 29% | 29.0% |
| 73 | 33% | 31% | 14.8 |
| 20 | 40% | 34% | 9.4 |
| 37 | 42% | 36% | 6.6 |

The above is repeated for all of the affected control units, yielding contention factors for each control unit of the DSB.

Referring to FIG. 8, after determining the contention factors for the affected control units of the DSB, the contention factors are converted into projected I/O velocities using, for instance, a table per control unit built and managed by a workload manager. The table begins with at least two points: one having an I/O velocity of zero and a contention factor of 100, and another having an I/O velocity of 100 and a contention factor of zero; and it is a running record of control units, and associated actual contention factors and I/O velocities the workload manager has seen in the past. To keep this running record, WLM measures the current I/O velocity and contention factor of each control unit. It then stores the measured I/O velocity in the table entry which represents the contention factor measured. In one embodiment, the table has 50 entries. Each entry in the table represents a contention factor range of 2. The first entry represents contention factors of 0 to 1, the second entry 2 to 3, and so on. If the entry for the current contention factor is empty, WLM stores the measured I/O velocity in the entry. If the entry is not empty, WLM stores a value which is equal to (3* current value+the new I/O velocity)/4. After saving the new I/O velocity, WLM verifies that the rest of the table is consistent with the new I/O velocity. All I/O velocities for higher contention factors should be lower, and I/O velocities for low contention factors should be higher. WLM clears any table entries that are inconsistent with the new I/O velocity.

Thus, a contention factor is looked up in the table to see historically the result (projected I/O velocity). If the exact value is not in the table, then an interpolation is performed.

So, for the example above, assume the following is determined:

| CHPID | UTILIZATION | AVERAGE UTILIZATION | CONTENTION FACTOR | I/O VELOCITY |
|---|---|---|---|---|
| 48 | 29% | 29% | 29.0% | (72) |
| 73 | 33% | 31% | 14.8 | (78) |
| 20 | 40% | 34% | 9.4 | (83) |
| 37 | 42% | 36% | 6.6 | 95 |

In one embodiment, the I/O velocity associated with the lowest contention factor is selected to represent the control unit. Thus, in the above example, the lowest contention factor for Control Unit 220, e.g., 6.6, is used as a contention factor for the control unit. Therefore, the I/O velocity for this control unit is 95. The above is repeated for all of the control units of the DSB, and then these projected I/O velocities are returned to project adjusted I/O velocity in FIG. 7 to determine the projected adjusted I/O velocities for the control units of the DSB.

In one example, only the I/O velocity of the lowest contention factor of a control unit needs to be calculated. The others are shown for example purposes.

Described in detail above is a capability for projecting I/O velocities for affected controllers of I/O configuration changes. The projected I/O velocities can be used to determine the best option to be employed to move a controller within its target range.

As described above, one part of the technique is to assign channel path loads. One example of this processing is as follows:

Assume two control units, 4800 and 5600.
Both share the same two CHPIDs, 21 and 22.
CU 4800 has a load of 80, while CU 5600 has a load of 50.
There is an expectation that the CHPID utilizations as equal at (80+50)/2 or 65 each.

Failed Load.CU4800=0.800
Failed Load.CU5600=0.500
Trial Load.CU4800=0.400
Trial Factors.CU4800=0.666
Trial Factors.CHPID21=0.666
Trial Factors.CHPID22=0.666
Trial Load.CU5600=0.250
Trial Factors.CU5600=0.333
Trial Factors.CHPID21=1.000
Trial Factors.CHPID22=1.000
Delta Load=0.333
New Load.CHPID21=0.333
Failed Load.CU4800=0.466
Old Load.CU4800.CHPID21=0.333
Delta Load=0.333
New Load.CHPID22=0.333
Failed Load.CU4800=0.133
Old Load.CU4800.CHPID22=0.333
Delta Load=0.166
New Load.CHPID21=0.500
Failed Load.CU5600=0.333
Old Load.CU5600.CHPID21=0.166
Delta Load=0.166
New Load.CHPID22=0.500
Failed Load.CU5600=0.166
Old Load.CU5600.CHPID22=0.166
Path Load.CHPID21=0.500
Path Load.CHPID22=0.500
- - - end of first iteration of major loop
Trial Load.CU4800=0.066
Trial Factors.CU4800=0.071
Trial Factors.CHPID21=0.071
Trial Factors.CHPID22=0.071
Trial Load.CU5600=0.083
Trial Factors.CU5600=0.090
Trial Factors.CHPID21=0.162
Trial Factors.CHPID22=0.162
Delta Load=0.030
New Load.CHPID21=0.530
Failed Load.CU4800=0.102
Old Load.CU4800.CHPID21=0.364
Delta Load=0.030
New Load.CHPID22=0.530
Failed Load.CU4800=0.071
Old Load.CU4800.CHPID22=0.364
Delta Load=0.039
New Load.CHPID21=0.569

Failed Load.CU5600=0.127
Old Load.CU5600.CHPID21=0.205
Delta Load=0.039
New Load.CHPID22=0.569
Failed Load.CU5600=0.088
Old Load.CU5600.CHPID22=0.205
Path Load.CHPID21=0.569
Path Load.CHPID22=0.569
- - - end of second iteration of major loop
. . . and eventually it converges and their result is:

```
Input Data:
CU4800  800 21 22
CU5600  500 21 22
EOF
```

|  | Paths | |
|---|---|---|
|  | 21 | 22 |
| CTL Unit |  | Loads |
| CU4800 |  |  |
| 80.0 | 40.0 | 40.0 |
| CU5600 |  |  |
| 50.0 | 25.0 | 25.0 |
| Totals: | 65.0 | 65.0 |

It took 16 iterations to assign the channel-path load. Therefore, the results equal the expectations.

Described in detail above is a capability for projecting the impact of a configuration change on one or more controllers. Although in the embodiment above, the project I/O velocity routine is invoked twice for a DSB, once for the current configuration and once for a proposed configuration, this is only one example. In another example, the routine is only invoked for the proposed configuration. In that example, there may also be no need for determining the projected adjusted I/O velocity. The projected I/O velocity may suffice.

In the embodiments described above, various computing environments and systems are described. These are only examples and are not intended to limit the various aspects of the present invention. Further, various aspects of the present invention are described with reference to logical partitions. The use of logical partitions is only one example. Aspects of the invention will apply to other types of partitioning, as well as to non-partitioned systems. Thus, these are also considered within the scope of the present invention.

In one example, for non-partitioned systems, storage within a global repository (such as within a coupling facility) is not necessary.

Although an embodiment of the invention is described in terms of a control unit and channels, the invention is not limited to such components. Aspects of the invention are equally applicable to other controllers and resources in other environments, such as storage area networks and other networks. For instance, in further embodiments, the controller is a processor which is communicating with (or transferring data with) another processor (e.g., using channel-to-channel communications); or the controller is a single device (e.g., an I/O device), which has no intelligent control unit between it and a processor. Further, aspects of the invention are equally applicable to environments in which the logic (e.g., for determining whether a constraint exists for a controller) is executed by a controller communicating directly with (or transferring data directly with) the other controller.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of projecting an impact of configuration changes on controllers, said method comprising:

selecting a controller associated with a configuration change; and projecting an impact of the configuration change on the controller, wherein said projecting quantifies the impact.

2. The method of claim 1, wherein said projecting comprises determining a projected I/O velocity of said controller, said projected I/O velocity quantifying the impact.

3. The method of claim 2, wherein said determining comprises:

projecting utilization of one or more channels of said controller to obtain one or more channel utilizations;

determining one or more contention factors for said controller, said determining employing said one or more channel utilizations; and obtaining said projected I/O velocity using at least one contention factor of said one or more contention factors.

4. The method of claim 3, wherein said projecting utilization of one or more channels comprises:

iteratively adjusting projected load on the one or more channels until a projected unassigned load associated with said controller is at a predefined level; and determining projected utilization of the one or more channels, in response to the iteratively adjusting.

5. The method of claim 3, wherein said determining one or more contention factors comprises using said one or more channel utilizations to determine one or more average channel utilizations, and using said one or more average channel utilizations to determine said one or more contention factors.

6. The method of claim 3, further comprising selecting the lowest contention factor from said one or more contention factors, and using said lowest contention factor to obtain said projected I/O velocity.

7. The method of claim 1, wherein said projecting said impact comprises:

projecting an I/O velocity for said controller using a current configuration of said controller to obtain a first projected value;

projecting an I/O velocity for said controller using a proposed configuration to obtain a second projected value; and using said first projected value and said second projected value to obtain a quantification of the impact.

8. The method of claim 7, wherein said using comprises:

subtracting said first projected value from said second projected value to obtain a delta; and adding the delta to an actual I/O velocity previously determined for said controller to obtain a quantification of the impact.

9. The method of claim 1, wherein said controller comprises a control unit.

10. The method of claim 1, wherein said controller comprises one of the following:

a processor communicating with another processor; and a single device.

11. A system of projecting an impact of configuration changes on controllers, said system comprising:

means for selecting a controller associated with a configuration change; and means for projecting an impact of the configuration change on the controller, wherein the projecting quantifies the impact.

12. The system of claim 11, wherein said means for projecting comprises means for determining a projected I/O velocity of said controller, said projected I/O velocity quantifying the impact.

13. The system of claim 12, wherein said means for determining comprises:

means for projecting utilization of one or more channels of said controller to obtain one or more channel utilizations;

means for determining one or more contention factors for said controller, said means for determining employing said one or more channel utilizations; and means for obtaining said projected I/O velocity using at least one contention factor of said one or more contention factors.

14. The system of claim 13, wherein said means for projecting utilization of one or more channels comprises:

means for iteratively adjusting projected load on the one or more channels until a projected unassigned load associated with said controller is at a predefined level; and means for determining projected utilization of the one or more channels, in response to the iteratively adjusting.

15. The system of claim 13, wherein said means for determining one or more contention factors comprises means for using said one or more channel utilizations to determine one or more average channel utilizations, and means for using said one or more average channel utilizations to determine said one or more contention factors.

16. The system of claim 13, further comprising means for selecting the lowest contention factor from said one or more contention factors, and wherein said means for obtaining comprises means for using said lowest contention factor to obtain said projected I/O velocity.

17. The system of claim 11, wherein said means for projecting said impact comprises:

means for projecting an I/O velocity for said controller using a current configuration of said controller to obtain a first projected value;

means for projecting an I/O velocity for said controller using a proposed configuration to obtain a second projected value; and means for using said first projected value and said second projected value to obtain a quantification of the impact.

18. The system of claim 17, wherein said means for using comprises:

means for subtracting said first projected value from said second projected value to obtain a delta; and means for adding the delta to an actual I/O velocity previously determined for said controller to obtain a quantification of the impact.

19. The system of claim 11, wherein said controller comprises a control unit.

20. The system of claim 11, wherein said controller comprises one of the following:

a processor communicating with another processor; and a single device.

21. A system of projecting an impact of configuration changes on controllers, said system comprising:

a controller associated with a configuration change; and a processor to project an impact of the configuration change on the controller, wherein the projection quantifies the impact.

22. At least one program storage device readable by a machine, tangibly embodying at least one program of instructions executable by the machine to perform a method of projecting an impact of configuration changes on controllers, said method comprising:

selecting a controller associated with a configuration change; and projecting an impact of the configuration change on the controller, wherein said projecting quantifies the impact.

23. The at least one program storage device of claim 22, wherein said projecting comprises determining a projected I/O velocity of said controller, said projected I/O velocity quantifying the impact.

24. The at least one program storage device of claim 23, wherein said determining comprises:

projecting utilization of one or more channels of said controller to obtain one or more channel utilizations;

determining one or more contention factors for said controller, said determining employing said one or more channel utilizations; and obtaining said projected I/O velocity using at least one contention factor of said one or more contention factors.

25. The at least one program storage device of claim 24, wherein said projecting utilization of one or more channels comprises:

iteratively adjusting projected load on the one or more channels until a projected unassigned load associated with said controller is at a predefined level; and determining projected utilization of the one or more channels, in response to the iteratively adjusting.

26. The at least one program storage device of claim 24, wherein said determining one or more contention factors comprises using said one or more channel utilizations to determine one or more average channel utilizations, and using said one or more average channel utilizations to determine said one or more contention factors.

27. The at least one program storage device of claim 24, wherein said method further comprises selecting the lowest contention factor from said one or more contention factors, and using said lowest contention factor to obtain said projected I/O velocity.

28. The at least one program storage device of claim 22, wherein said projecting said impact comprises:

projecting an I/O velocity for said controller using a current configuration of said controller to obtain a first projected value;

projecting an I/O velocity for said controller using a proposed configuration to obtain a second projected value; and using said first projected value and said second projected value to obtain a quantification of the impact.

29. The at least one program storage device of claim 28, wherein said using comprises:

subtracting said first projected value from said second projected value to obtain a delta; and adding the delta to an actual I/O velocity previously determined for said controller to obtain a quantification of the impact.

30. The at least one program storage device of claim 22, wherein said controller comprises a control unit.

31. The at least one program storage device of claim 22, wherein said controller comprises one of the following:

a processor communicating with another processor; and a single device.

* * * * *